May 24, 1932. R. W. CANFIELD 1,859,957
ROLLING PROCESS FOR GLASSWARE
Filed May 16, 1929. 2 Sheets-Sheet 1
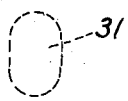
Fig. 1.
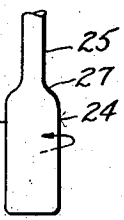
Fig. 2.
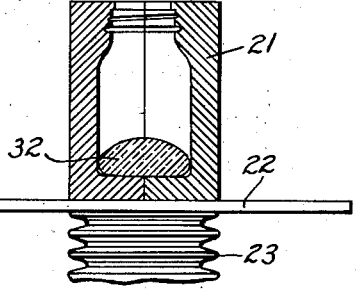
Fig. 3. Fig. 4.
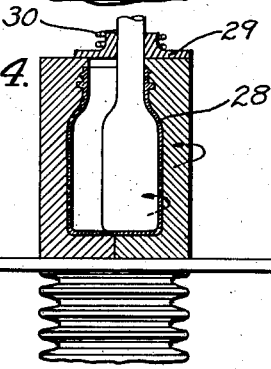
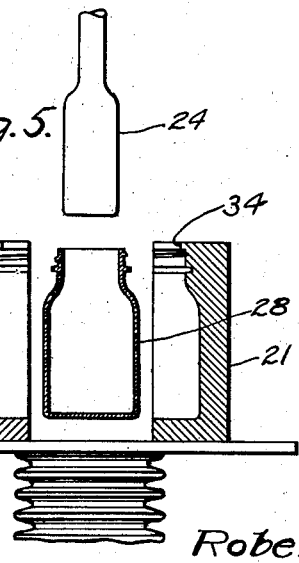
Fig. 5.
Witness:
G. A. Duling
Inventor;
Robert W. Canfield
by Brown & Parham
Attorneys.

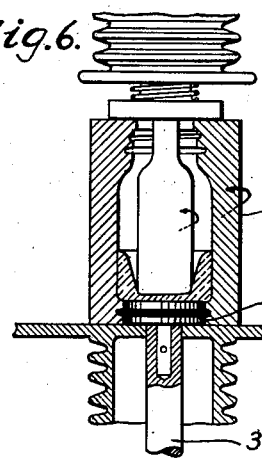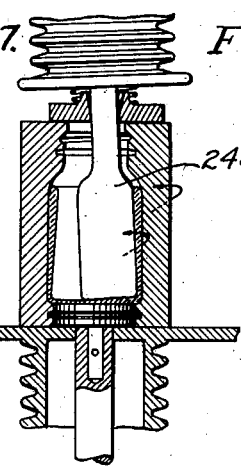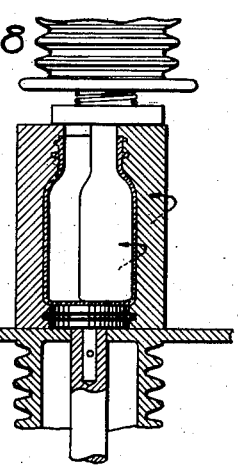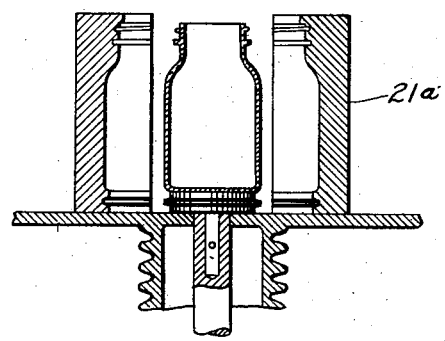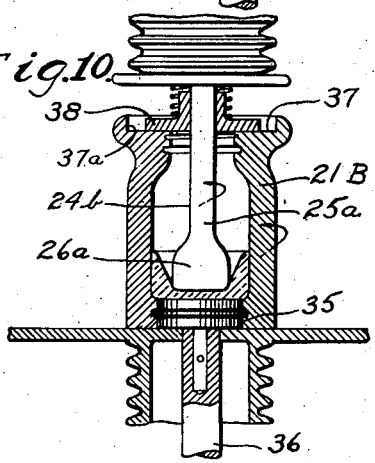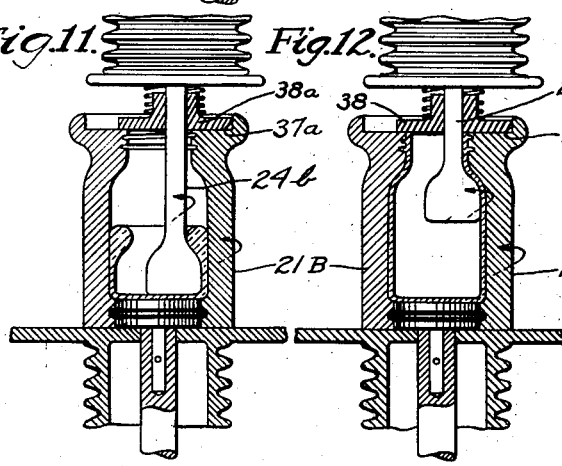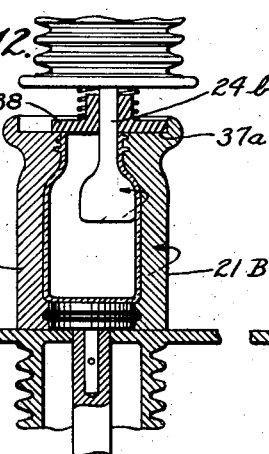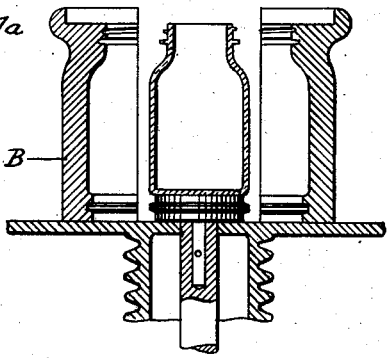

Patented May 24, 1932

1,859,957

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

ROLLING PROCESS FOR GLASSWARE

Application filed May 16, 1929. Serial No. 363,513.

My invention relates to the manufacture of hollow glass articles and particularly to those types of glassware heretofore made by the "press" and "press and blow" methods.

Among the objects of my invention is the provision of a novel method and apparatus whereby articles, which have heretofore been manufactured by "pressing" or "pressing and blowing", may be produced by the use of centrifugal force or by a rolling or ironing force or a combination of these forces.

Another object of the invention is the provision of a method and apparatus whereby glassware may be formed having uniform and accurately controlled distribution of glass throughout the various portions of its walls.

A further object of the invention is to provide a method and means by which such uniformity of distribution may be obtained without particular regard to the uniformity of temperature and viscosity of the glass fed to the apparatus.

A further object is to provide a method by which an increased rate of production of ware of the above stated types may be had. Other objects will appear from the following specification when considered in connection with the accompanying drawings, in which I have illustrated three modifications of apparatus by which my novel method may be performed.

Figures 1 to 5 illustrate diagrammatically the apparatus and the steps employed in one method of my invention in the formation of semi-wide mouth ware, such as is now usually made by the "press and blow" method;

Figs. 6 to 9, inclusive, diagrammatically illustrate a variation from the method shown in Figs. 1 to 5, inclusive; and Figs. 10 to 13 inclusive illustrate a further modification of the method and a slightly different form of apparatus used in performing that method.

Heretofore, wide mouth and semi-wide mouth glassware have been manufactured by either the "pressing" method or by the "press and blow" method. In the "pressing" method, a charge of glass of proper shape, weight and viscosity is deposited in a mold into which a pressing plunger is forced, the glass being squeezed or forced upwardly by the plunger into the space between the interior walls of the mold and the plunger, to give the glassware the desired shape. In the "press and blow" method, a preliminary shape called a blank or parison, is first given to the glass in one mold by an operation somewhat similar to the pressing operation, save that the plunger is usually quite small. After this preliminary formation, and while the glass is still plastic, the blank is transferred to a blow mold wherein the cavity formed therein by the pressing plunger is enlarged by the application of compressed air and the blank blown to final form. In the "press and blow" method, particularly, the temperature and viscosity of the glass as well as the shape of the charge delivered must be quite accurately controlled if the final article is to have walls of reasonably uniform thickness. If the parison is of non-uniform or non-symmetrical viscosity when the final blowing pressure is applied to it, the distribution will not be uniform, as the hotter portion of the glass will blow out to a greater extent than the colder portions.

My novel method differs fundamentally from these older methods in that it may make use of centrifugal force set up in the glass charge by a rapid spinning of the mold. This centrifugal force spreads the glass outwardly and upwardly along the lower portions of the mold and forms a depression or cavity in the longitudinal central of the charge into which a spinning tool may be moved. This spinning tool is then suitably operated to act as a roller or "iron" to positively work the glass against the wall cavities of the mold as is generally illustrated in the drawings.

Referring particularly to the drawings, Figs. 1 to 5 inclusive, wherein I have illustrated diagrammatically the broad steps of my method and the apparatus used in performing the same, 21 is a divided mold having an interior cavity corresponding to the external shape of the article to be formed. This mold is mounted upon a suitable carrier 22 upon which may be mounted also suitable means (not shown) for opening and closing the mold to permit the removal of the finished article. Suitable cooling devices, as fins 23, may be employed to prevent heat of mold spreading to the mold rotating mechanism. The carrier 22 and the mold 21 are provided with suitable means to cause a rapid rotation thereof about the vertical axis of the mold. Such means are not shown, but will readily suggest themselves to those skilled in the art.

The first step of my process comprises the deposits in the mold 21 of a suitable charge of molten glass 31 which settles in the bottom of the mold as illustrated at 32. This deposit may be made while the mold is spinning, but I prefer to make the deposit prior to the spinning of the mold. As soon as the charge has been received and settled, the mold may be spun rapidly, setting up a centrifugal action in the glass and causing it to spread outwardly, completely covering the bottom of the mold and working up on the sides thereof as shown in 33 (Fig. 2). This action causes a concavity or depression in the central portion of the charge. While the mold is still spinning, I then insert into the mold a spinning or ironing tool 24 having a stem 25 suitably attached to mechanism (not shown) adapted to impart the necessary spinning and translatory movements to the tool. As shown in Figs. 2, 3 and 4, the head 26 is enlarged but not to too great an extent to permit it to pass freely through the upper and smaller portion of the mold. In the form shown in Figs. 1 to 5, this head 26 has a shoulder 27 and the glass engaging portion of the tool corresponds in length and in contour with the length and internal shape of the finished article. Its horizontal dimensions are, however, less than the horizontal dimensions of the article to be made. The tool may carry a suitable mold closure plate 29 which may be provided with cooling fins 30 similar to fins 23.

After the glass has taken the form shown at 33 in Fig. 2, the spinning tool is inserted through the neck of the mold and centrally thereof and forced downwardly as illustrated in Fig. 3 to the proper extent to iron or press out the central bottom portion of the glass. The tool, while still spinning, is then given a suitable translatory or orbital movement within and around the mold walls at a distance from the walls equal to the desired thickness of the walls of the finished ware. This movement, as illustrated in Fig. 4, rolls or irons the glass of the charge up and about the walls of the cavity of the mold as shown in Fig. 4, thus positively forming the glass article 28 which, because of the transference of heat through the mold and the spinning tool and its cooling fins, sets in the form indicated in Fig. 4. It is to be noted that in the particular form shown in Figs. 1 to 5, the thickness of the finish or top portion of the bottle is generally controlled by projecting portions 34 of the mold halves against which the stem 25 of the spinning tool moves. After the ironing or rolling is completed and the glass has been forced to and sets in the shape shown in Fig. 4, the rotation of the mold and carrier 22 may be stopped and the mold opened to permit the removal of the finished ware, the spinning tool having been moved upwardly and out of the article. If desired, the mold may be provided with a suitable bottom plate and means for raising the bottom plate after the formation of the bottle and the opening of the mold as is illustrated in Figs. 6 to 13. Such an arrangement will facilitate the removal of the bottles. If desired, the spinning of the mold may be omitted in the event that the relative movement of the mold and tool is accomplished through suitable movement of the tool.

In the modification shown in Figs. 6 to 9 inclusive, the steps of the method are substantially the same as those illustrated in Figs. 1 to 5, except that the translatory movement of the spinning tool 24a during the rolling or ironing process is somewhat different during the stage illustrated in Fig. 7. As there illustrated, the spinning tool is moved from its vertical position to aid the upward movement of the glass during the preliminary stages of the rolling or ironing process. The mold 21a is shown as provided with a bottom plate 35 carried upon a stem 36 which facilitates the removal of the ware as shown in Fig. 9. If desired, the stem 36 may be given a reciprocatory movement to lift the top of the ware above the mold to further facilitate the removal of the ware, and with this arrangement, it is obvious that the ware may if desired be removed without cessation of the spinning of the mold.

The modified process illustrated in Figs. 10 to 13 is in general the same as that heretofore described, though the apparatus employed therein is slightly different and the movements given to the spinning tool are also different. In the apparatus shown herein, the mold 21B is provided with an upwardly facing top shoulder 37 for the reception of a spring pressed plate 38 which is carried upon the spinning tool mechanism. The plate 38 on the shoulder 37 is surrounded by an inwardly facing annular shoulder 37a with which the plate 38 cooperates to generally control the thickness of the side walls of the finished article and particularly the neck portion thereof as will be apparent from a consideration of Figs. 11 and 12. This plate is quite similar to the ordinary pressing plate used in the ordinary pressing operations. As with the form shown in Figs. 6 to 9, inclusive, a bottom plate 35 and stem 36 are provided for the purposes above mentioned. The spinning tool 24b shown in Figs. 10 to 13 has a stem 25a and employs a head 26a of slightly different contour from that shown in the earlier figures and the tool receives a different translatory movement to effect the ironing of the glass against the sides of the mold. In this case, the tool is first moved centrally of the mold to first form the bottom portion of the article and then is moved both horizontally and vertically to iron the glass up by steps from the bottom to the top of the mold.

It is thus seen that my method may be performed by very simple and inexpensive machinery. It has the advantage of assuring both a rapid production of glassware and a positively controlled distribution of the glass in the ware. This positive control makes the accurate control of the viscosity and temperature of the charges of less importance than it has heretofore been the case and insures the uniform desired distribution without particular regard to the precise condition of the glass. Furthermore the spinning and ironing action tends to polish the glass, and hence to impart to it a high luster which generally increases its salability.

My method may be modified in many particulars within the spirit of my invention and the apparatus used in the performance thereof may take numerous forms, still within the spirit of my invention.

I claim:

1. The method of forming hollow glassware, which comprises depositing a charge of glass in a mold, which is rotatable on a vertical axis and has an article forming cavity opening upward and concentric with the mold axis, forming the bottom of the article by pressing the glass against the bottom of the mold with a spinning tool, thereafter spinning the glass up the sides of the mold to form the sides of the article by rotating the spinning tool and the mold at relative speeds such that their adjacent portions are moving at substantially the same peripheral speed and simultaneously moving the spinning tool in a direction laterally of the mold axis to press the glass between the tool and the side of the mold, and inclining the axis of rotation of the spinning tool during the initial part of the aforesaid lateral movement so that it diverges from the axis of rotation of the mold toward the bottom of the latter, whereby the glass being spun upwardly to form the sides of the article will be thicker at its uppermost portion during the intermediate part of the spinning operation and the chill will progress in the formation of the article from the bottom toward the top thereof.

2. The method according to claim 1, characterized in that after the glass has been spun a material distance up the sides of the mold to form the sides of the article, the axis of the spinning tool is brought parallel to the side of the article being formed, whereby to form an article having sides of even thickness throughout.

3. The method of forming glassware, which comprises depositing a charge of molten glass in a mold which is rotatable about a vertical axis and which has its open end vertically upward, inserting into the mold a spinning tool having an enlarged head at its lower end of less height than the article being formed and which is rotated about a vertical axis a variable distance eccentric of the axis of rotation of the mold, forming the bottom of the article by coaction between the spinning tool and the mold bottom, spinning the glass up the sides of the mold by rotating the mold and tool at a speed such that their adjacent portions which engage the glass therebetween a removing at substantially the same peripheral speed, and progressively moving the spinning tool vertically upward progressively to form a solid skin on the inside and outside of the side wall of the article while retaining the glass which is to form upper portions of the wall as a relatively thick annular ring above the enlarged portion of the spinning tool, whereby to minimize skin formation until the glass has been thinned down to substantially the thickness desired for the walls of the article.

Signed at Hartford, Connecticut this 15th day of May, 1929.

ROBERT W. CANFIELD.